United States Patent [19]
Condon

[11] Patent Number: 5,230,488
[45] Date of Patent: Jul. 27, 1993

[54] CLIP-ON PIPE HANGING CLAMP

[76] Inventor: Duane R. Condon, 2330 Raymond Ave., Ramona, Calif. 92065

[21] Appl. No.: 913,154

[22] Filed: Jul. 14, 1992

[51] Int. Cl.⁵ .............................................. F16L 3/08
[52] U.S. Cl. .................................... 248/73; 248/74.1
[58] Field of Search .............. 248/74.2, 74.3, 74.1, 248/74.4, 73, 65, 62, 316.1; 24/339

[56] References Cited

U.S. PATENT DOCUMENTS

| | | | |
|---|---|---|---|
| 2,216,886 | 10/1940 | Langelier | 248/70 X |
| 2,992,800 | 7/1961 | Madson | 248/74.1 X |
| 3,185,420 | 5/1965 | Stewart | 248/74.5 |
| 3,503,580 | 3/1970 | Levy | 248/62 |
| 3,684,223 | 8/1972 | Logsdon | 248/74.1 |
| 4,369,945 | 1/1983 | Mantoan et al. | 248/73 |
| 4,379,537 | 4/1983 | Perrault et al. | 248/74.5 |
| 4,714,218 | 12/1987 | Hungerford, Jr. | 248/62 |
| 5,024,405 | 6/1991 | McGuire | 248/73 |
| 5,154,375 | 10/1992 | Condon | 248/74.1 X |

Primary Examiner—Ramon O. Ramirez
Attorney, Agent, or Firm—Baker, Maxham, Jester & Meador

[57] ABSTRACT

A unitary plastic clamp for mounting copper water pipe on HYCO strap has a split cylindrical clamp portion, a rectangular mounting platform and an arm that extends from the clamp portion. The platform has a centrally located peg which is inserted into a selected hole in the strap. The platform is then twisted on the strap to engage L-shaped flanges on opposite corners of the platform with opposite side edges of the strap. The arm is then pushed up over the strap to engage a hook member on the outer end of the arm with a strap edge. The resulting spring force urges the hook member downwardly to cinch the pipe inside the clamp portion and firmly anchor the clamp and pipe relative to the strap.

8 Claims, 2 Drawing Sheets

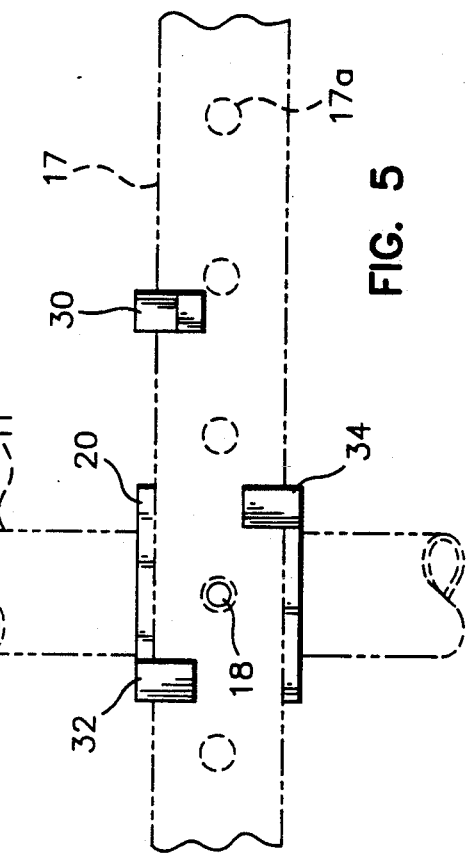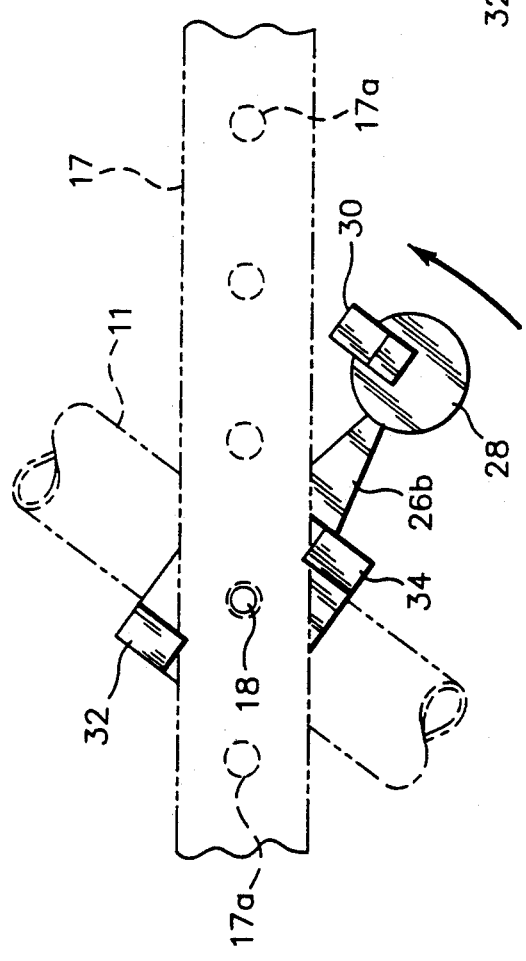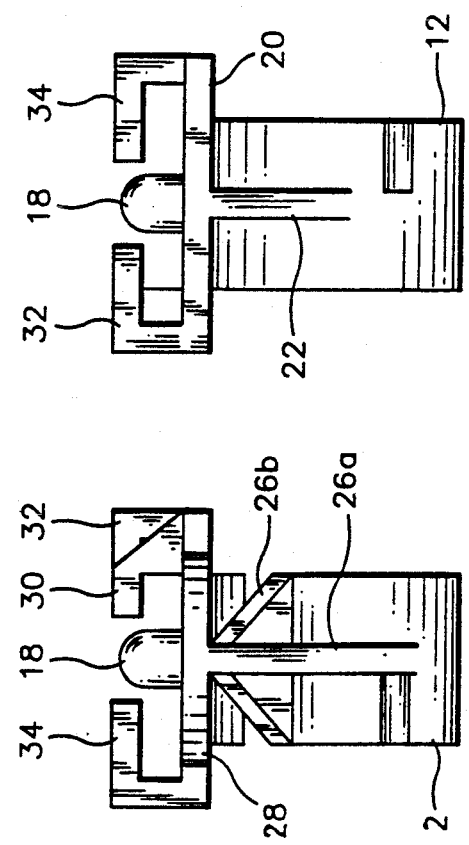

CLIP-ON PIPE HANGING CLAMP

BACKGROUND OF THE INVENTION

The present invention relates to building construction, and more particularly to plumbing fixtures used to mount water pipe to studs or joists.

Copper water pipe should not be supported over long distances by extending through holes drilled in studs. Such holes are time consuming to drill and weaken the strength of the stud. Also, water hammer in the pipe can cause the pipe to move in the studs since the holes are typically larger than the outside diameter of the pipe.

A large number of pipe hanging clamps have been developed in the past for supporting thin walled copper water pipe in building constructions. These clamps need to accommodate thermal expansion of the copper pipe. The clamps should not be made of dissimilar metal since galvanic action can cause corrosion. Copper pipe straps are relatively expensive and must normally be nailed to studs.

The following is a list of U.S. patents showing various clamps and hangers in this field:

U.S. Pat. No. 2,216,886 - Titled: Holder - Langelier
U.S. Pat. No. 2,992,800 - Titled: Pipe Hanger - Madson
U.S. Pat. No. 3,503,580 - Titled: Universal Conduit Support Bracket Levy
U.S. Pat. No. 3,684,223 Titled: Pipe Clamp - Logsdon
U.S. Pat. No. 4,369,945 - Titled: Cable Clamps - Mantoan et al.
U.S. Pat. No. 4,379,537 - Titled: Cable Hanger - Perrault et al.
U.S. Pat. No. 4,714,218 - Titled: Hanger for Pipe Clamp - Hungerford, Jr.

More recently it has been common to surround the pipe with clamps hung on straps nailed between studs. Strap material of this type is widely used and is sold under the trademark HYCO. It has holes punched in the center at regular intervals.

Of the foregoing patented devices, the pipe clamp of U.S. Pat. No. 3,684,223 of Logsdon has been widely used by plumbers. However, it must either be nailed to a stud or secured with screws or bolts to a HYCO strap, which adds time and cost to the plumbing installation.

The pipe hanging clamp disclosed in U.S. Pat. No. 5,024,405 of McGuire has a central peg and two other pegs on either side of the central peg. This device can be rotated into engagement with corresponding holes in a HYCO strap. The principal drawback of this device is that the holes in the HYCO strap are not precision drilled and the pegs are not precisely located on the clamp due to tolerance variations in the injection molding. Therefore it is sometimes difficult, if not impossible, to align the pegs with a pair of holes in the HYCO strap. Also, removal of the McGuire device from the HYCO strap once it has been snapped into place is extremely difficult. This makes it hard to re-mount the clamp if the plumber misjudges the initial location for the pipe mounting. Additionally, the McGuire device requires two steps, namely, mounting the device onto the strap and then squeezing the mating ratchet and pawl portions together around the pipe. Plumbers frequently squeeze the pipe too tightly and the plastic parts fatique. Also, the ratchet and pawl sometimes break away from the base portion of the McGuire device.

SUMMARY OF THE INVENTION

It is therefore the primary object of the present invention to provide an improved pipe hanging clamp.

According to the present invention a pipe hanging clamp comprises a cylindrical clamp portion having an inner wall forming a hole for receiving a pipe therethrough, and a gap therein for allowing the clamp portion to be cinched around the pipe. A mounting platform is connected to the clamp portion and has a first flange on a first side edge of the platform for engaging and extending over a first side edge of a mounting strap and a second flange on a second side edge of the platform opposite the first side edge of the platform for engaging and extending over a second side edge of the strap. A mounting peg extends from the center of the platform for engaging a hole in the mounting strap. An arm is connected to and extends from the clamp portion and has a member for also engaging the first side edge of the mounting strap. The clamp portion, mounting platform and arm are injection molded of plastic as a unitary body. The clamp is configured and dimensioned so that the pipe is cinched inside the clamp portion when installed on the strap. This is done by inserting a mounting peg in a hole in the strap and angularly displacing the platform relative to the strap until the first flange is engaged with the first side edge of the strap and the second flange is engaged with the second side edge of the strap. The arm is also pushed over the strap to permit the hook member to engage the first side edge of the strap. The angular displacement of the arm provides a spring force that forces the hook member against the first side edge of the strap to thereby hold the clamp and pipe firmly in position.

BRIEF DESCRIPTION OF THE DRAWINGS

FIG. 4 is a reduced view of the preferred embodiment of my pipe hanging clamp illustrating an initial step in attaching the same on a mounting strap after a pipe has been inserted through the clamp.

FIG. 5 is a view similar to FIG. 4 illustrating the final alignment of the preferred embodiment of my pipe hanging clamp after it has been fully attached to the mounting strap.

FIG. 6 is an end elevation view of the preferred embodiment of my pipe hanging clamp taken from the right side of FIG. 2.

FIG. 7 is an end elevation view of the preferred embodiment of my pipe hanging clamp taken from the left side of FIG. 2.

DESCRIPTION OF THE PREFERRED EMBODIMENT

Figure 1:
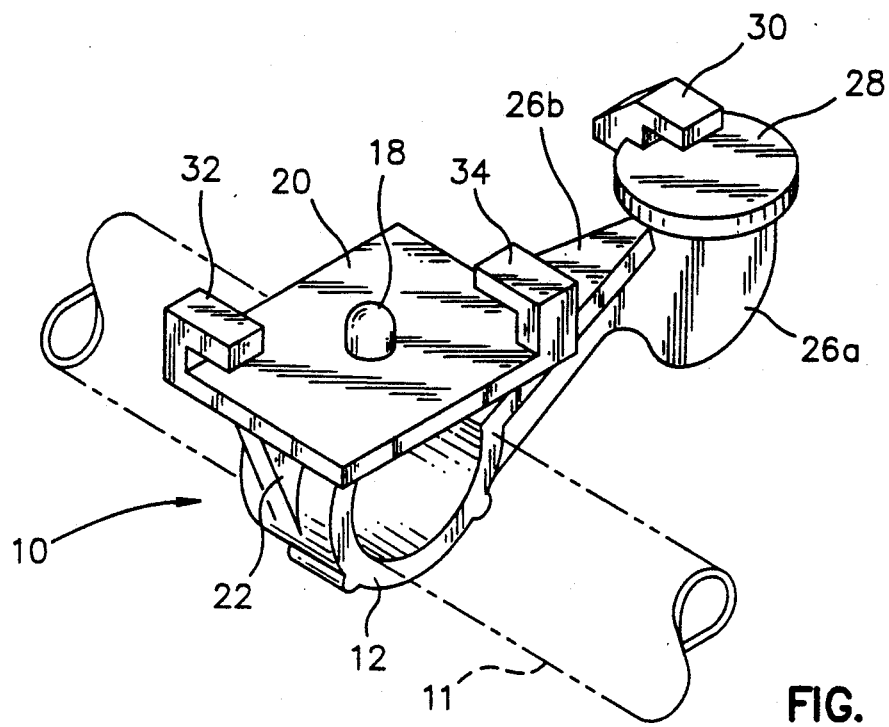
FIG. 1 is a perspective view of a preferred embodiment of my pipe hanging clamp showing a water pipe extending therethrough in phantom lines.

A preferred embodiment of my pipe hanging clamp 10 is illustrated in the perspective view of FIG. 1. The clamp is used in constructing homes and, in particular, in mounting a copper water pipe 11 so that it is supported between studs or joists (not illustrated). The clamp has a generally cylindrical clamp portion 12 having an inner wall 14 (FIG. 2) defining a hole through which copper pipe may be inserted. There is a slit or gap 16 in the clamp portion which allows it to expand and cinch around the copper pipe. The clamp is hung on HYCO strap 17 (FIG. 5) which has holes 17a punched in the center at regular intervals.

Figure 2:
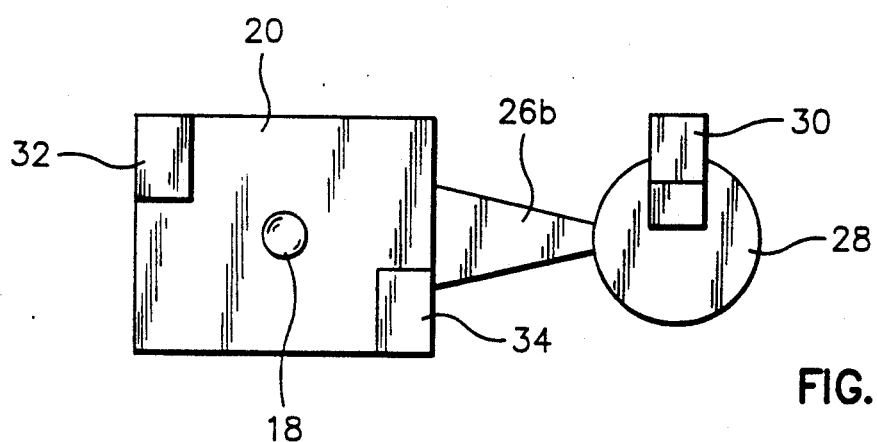
FIG. 2 a rear elevation view of the preferred embodiment of my pipe hanging clamp.
Figure 3:
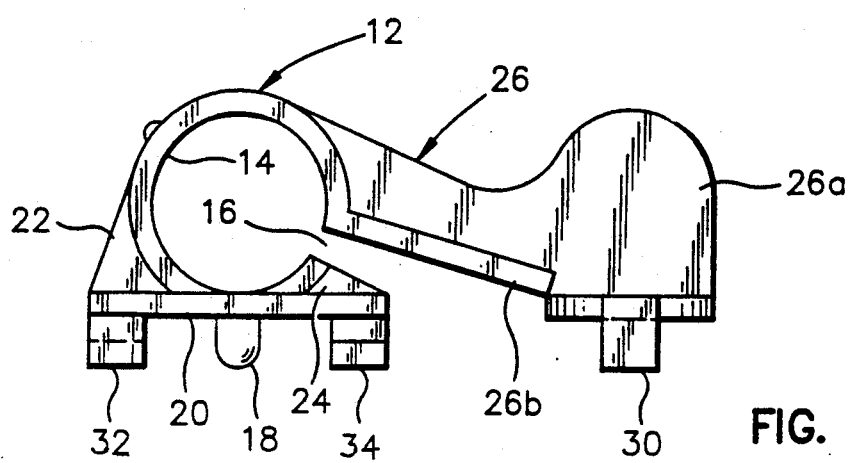
FIG. 3 is a side elevation view of the preferred embodiment of my pipe hanging clamp taken from the top of FIG. 2.

Referring to FIGS. 1-3, a mounting peg 18 extends from a first generally rectangular mounting platform 20 that extends from the clamp portion 12. Planar reinforcing webs 22 and 24 (FIG. 3) extend normal to the mounting platform 20 and connect the clamp portion and the mounting platform in order to enhance strength. A mounting arm 26 is connected to and extends from the clamp portion 12. It includes a main portion 26a with a generally planar configuration which extends normal to the mounting platform 20. A triangular planar reinforcing portion 26b (FIG. 6) of the arm extends along and is connected to one side edge of the main portion 26a of the arm, perpendicular to the main portion. A planar circular stop member 28 (FIG. 2) is connected to the outer end of the arm portion 26a and is co-planar with the mounting platform 20. As will be explained in further detail hereafter, both the mounting platform 20 and the circular stop member 28 overlie the HYCO strap 17 in co-planar fashion. A wedge shaped hook member 30 (FIG. 1) extends from the top edge of the circular stop member 28 and extends over the rearward face thereof. A pair of L-shaped flanges 32 and 34 (FIGS. 1, 6 and 7) extend from opposite corners on the rearward face of the mounting platform 20.

The manner of mounting the preferred embodiment 10 of my clip-on pipe hanging clamp can now be described. Referring to FIG. 4, the copper pipe 11 is inserted through the clamp portion 12. The mounting peg 18 is then inserted in a selected hole 17a in the strap 17 at the appropriate location. In order to accomplish this, the mounting platform 20 must extend at an acute angle with respect to the strap 17. Once this is accomplished, the platform 20 is rotated counter-clockwise as indicated by the arrow in FIG. 4 until it is in alignment generally parallel with the strap 17 as shown in FIG. 5. This causes the L-shaped flanges 32 and 34, which extend from mounting platform 20, to engage the upper and lower edges of the strap 17. As the platform 20 is being rotated, the arm 26 and the circular stop member 28 pass in front of the HYCO strap. The installer presses upwardly on the outer end of the main portion 26a until the hook member 30 clears the upper edge of the HYCO strap. The preferred embodiment is configured and dimensioned so that the clamp portion 12 and arm 26 are slightly deformed by pushing arm 26 and hook member 30 past the upper edge of the HYCO strap 17. The resulting spring force causes the hook member 30 to push down hard against the top edge of the strap. This causes the gap 16 to become smaller, cinching the clamp portion 12 around the copper pipe 11. The pipe 11 is thus firmly held in position. It is advantageous to have the gap 16 in the clamp portion 12 near the mounting platform 20 and to have the arm 26 extend from the clamp portion 12 adjacent the gap 16 from the terminal end of the clamp portion farthest away from the platform. This facilitates the spring action that is desired.

Preferably the illustrated embodiment 10 of my pipe hanging clamp is molded of suitable plastic such as polyethylene, ABS, PVC, or polypropylene. It is preferably injection molded a one-piece (unitary) body. After attachment, it can easily be removed from the strap by pushing up on the main portion 26a of the arm. This pushes hook member 30 up and away from the strap. The hook member 30 and arm 26 can then be rotated clockwise until L-shaped flanges 32 and 34 are free of the edges of the HYCO strap. Mounting platform 20 can then be pulled away from the strap to remove peg 18 from its hole 17a.

It will thus be understood that the preferred embodiment 10 may be installed on the strap 17 and the pipe 11 cinched tight all in a single operation. A similar one-step installation may be achieved with the pipe clamp disclosed in my U.S. Pat. No. 5,154,375 granted Oct. 13, 1992 The subject invention, however, permits the pipe 11 to extend at a ninety degree angle relative to the extension of the strap 17, but in the plane of the strap. This is desirable in some plumbing installations where the pipe hanging clamp of my aforementioned application would not be suitable.

While I have described a preferred embodiment of my pipe hanging clamps, it should be understood that modifications and adaptations thereof will occur to persons skilled in the art. Therefore, the protection afforded my invention should only be limited in accordance with the scope of the following claims.

I claim:

1. A pipe hanging clamp, comprising:
   a clamp portion having an inner wall forming a hole for receiving a pipe therethrough, and a gap therein for allowing the clamp portion to be cinched around the pipe;
   a mounting platform connected to the clamp portion and having a first flange on a first side edge of the platform for engaging and extending over a first side edge of a mounting strap and a second flange on a second side edge of the platform opposite the first side edge of the platform for engaging and extending over a second side edge of the strap;
   an arm connected to and extending from the clamp portion and having a hook member for engaging the first side edge of the mounting strap; and
   the clamp portion, mounting platform and arm being formed of plastic as a unitary body and being configured and dimensioned so that the pipe is cinched inside the clamp portion when the mounting platform is overlapped with the strap and is angularly displaced relative to the strap until the first flange is engaged with the first side edge of the strap, the second flange is engaged with the second side edge of the strap and the arm is pushed over the strap to permit the hook member to engage the first side edge of the strap, the angular displacement of the arm providing a spring force that urges the hook member against the first side edge of the strap to thereby hold the clamp and pipe firmly in position.

2. A clamp according to claim 1 wherein the clamp is made of plastic selected from the group consisting of polyethylene, polypropylene, ABS and PVC.

3. A clamp according to claim 1 wherein the flanges are L-shaped.

4. A clamp according to claim 1 wherein the clamp portion is generally cylindrical.

5. A clamp according to claim 1 wherein the member has a hook shape.

6. A clamp according to claim 1 wherein the arm includes a stop member formed on an outer end thereof for overlying the strap between the first and second side edges of the strap.

7. A clamp according to claim 1 and further comprising at least one reinforcing web connecting the platform and the clamp portion.

8. A clamp, according to claim 1, and further comprising a mounting peg extending from the mounting platform for engaging a hole in the mounting strap.

* * * * *